Oct. 5, 1937.  C. F. RAUEN  2,094,846
AUTOMATIC TRANSMISSION
Filed Jan. 19, 1934    6 Sheets-Sheet 1

INVENTOR.
Carl F. Rauen.
BY
ATTORNEY.

Patented Oct. 5, 1937

2,094,846

UNITED STATES PATENT OFFICE 2,094,846

AUTOMATIC TRANSMISSION

Carl F. Rauen, Grosse Pointe, Mich., assignor, by mesne assignments, to Borg-Warner Corporation, a corporation of Illinois Application January 19, 1934, Serial No. 707,298

22 Claims. (Cl. 74—336)

This invention, in general, relates to variable speed power transmitting mechanisms and in particular, to power transmitting mechanisms especially adapted for use in automotive vehicles and which mechanisms are normally automatically operative for effecting changes in the driving connection between the engine and the road wheels of an automotive vehicle.

The invention contemplates the provision in such a mechanism, of means for selectively effecting changes in the driving connection without regard to the particular condition of operation of the vehicle in which such a mechanism has been incorporated, to enable the operator of the vehicle expeditiously to cope with unusual traffic conditions in so far as such is possible through control of the transmission.

While automatic speed changing devices may be designed to operate responsive to one or more factors or conditions of operation of an automotive vehicle, the adaptability of such devices expeditiously to provide the desired driving connection under unusual driving or traffic conditions, as well as their range of flexibility, is limited by the factors or conditions of operation to which the device is responsive.

It seems both necessary and desirable to provide the operator of the vehicle with some means of control whereby a selective change in the character of the driving connection may be made at any time without regard to the particular condition of operation of the vehicle, and hence, without regard to the automatic speed changing device which temporarily must be locked out, so as not to interfere with the selective changes effected by the operator, and to that end, there are disclosed in this application, means associated with the operating instrumentalities of a vehicle for enabling the operator of a vehicle, optionally to select any drive at any desired time.

One of the principal objects of this invention is to provide a speed changing device for a power transmitting mechanism which may be effective either automatically or selectively for effecting changes in the driving connection between the engine and the road wheels of an automotive vehicle.

Another object of this invention is to provide a transmission in which the changes in the driving connection normally may be effected through speed control of the vehicle, but which may be optionally made by the operator of the vehicle at any time and without regard to the speed of the vehicle.

Another object of this invention is to utilize presently used operating instrumentalities of a vehicle for controlling the changes, both automatic and selective, in the driving connection between the engine and the road wheels.

Another object of this invention is to provide a power transmitting mechanism in which an automatic change to a direct drive may be made from either of a plurality of selective low speed drives.

Another object of this invention is to provide in conjunction with an automatic transmission, a main engine clutch operable responsive to predetermined conditions of engine operation for connecting and disconnecting the engine and the driving shaft of the transmission to facilitate the automatic operation thereof for effecting changes in the ratio of the driving connection between said shafts.

Another object of this invention is to provide a transmission in which the automatic speed changing mechanism is locked against operation, when the engine is at rest, to prevent undesirable operation of the speed changing mechanism under certain conditions of operation of the vehicle.

Other objects and advantages of this invention will be apparent from a reading of the following specification, with reference to the accompanying drawings, of which there are six sheets, and in which:

Fig. 2 is a longitudinal view partly in section of a power transmitting mechanism in which this invention has been incorporated;

Fig. 9 is a longitudinal view, partly in section, of a power transmitting mechanism embodying a modified form of the invention;

Figure 1:
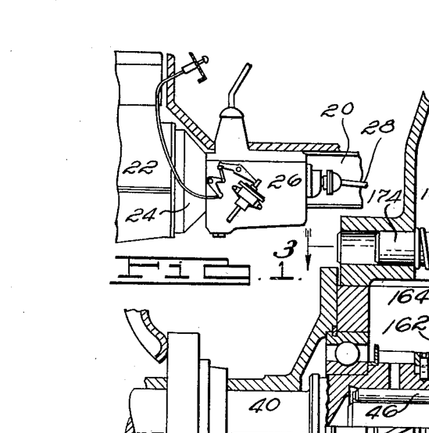
Fig. 1 is a diagrammatic view of a portion of an automotive vehicle in which a transmission embodying this invention has been incorporated.

Referring now particularly to Fig. 1, there is diagrammatically shown a portion of an automotive vehicle having a main frame 20 providing a support for an engine 22, a housing-enclosed clutch mechanism 24, a power transmitting mechanism or transmission 26, and a propeller shaft 28, suitably connected to the road wheels of the vehicle.

The power transmitting mechanism 26, in general, comprises a casing 30, providing a housing for the operating mechanism and a support for a cover plate 32, which is provided with a bell housing 34 providing a support for a shift lever 36. A driving shaft 40, suitably connected to the engine through the medium of the housing-enclosed clutch 24, is journaled in a bearing 42, suitably secured in an aperture in the forward wall of the transmission casing, and a driven shaft 44, connected to the propeller shaft 28 through a universal joint mechanism, is journaled at its forward end in a bearing 46 disposed within a counterbore provided in the posterior end of the driving shaft 40, and at its rearward end is journaled in a bearing 48, suitably secured in an aperture in the rearward wall of the casing 30.

The clutch 24, sometimes referred to as the main engine clutch, may be of that type commonly called "automatic" and in which the clutch is operable responsive to predetermined conditions of engine operation for automatically connecting and disconnecting the engine and the driving shaft of the transmission. These clutches may be actuated either centrifugally or by vacuum derived from any suitable source such as the intake manifold of the engine.

In this instance I have shown a main engine automatic clutch of the centrifugal type which is operable responsive to engine speed for connecting or disconnecting the engine and the driven shaft. This clutch may be set to operate at any predetermined speed of the engine, preferably around 15 miles per hour, and may also be operated manually at any time by a pedal such as pedal 386 (see Fig. 12). This clutch may be of any conventional construction. As shown, the clutch essentially comprises a clutch plate 25 slidably splined to the forwardly projecting end of the driving shaft 40 which is adapted to be pressed against the flywheel of the engine by a pressure plate 27. Pressure plate 27 may be operated manually by a pedal 386 operating through suitable linkages and connected to sleeve 31 for breaking the driving connection, and by centrifugal weights 29 radially movable responsive to engine speed and operating through camming means for pressing plate 25 against the flywheel of the engine to connect the same with driving shaft 40 for the purpose of driving the same. It will be understood that pressure plate 27 and the mechanism associated therewith for moving the same are carried and rotatable with the engine flywheel.

A cluster of gears, indicated generally at 50 and rotatably mounted upon a countershaft 52 secured in the lower part of the transmission casing 30 in parallelism with the driving shaft 40 and the driven shaft 44, provides a part of a train of gears for driving the driven shaft 44 from the driving shaft 40 and at a reduced rate of speed with respect thereto. A posterior end portion of the driving shaft 40 within the casing may be formed to provide a helical gear 54, which constantly meshes with a helical gear 56 of the cluster of gears for the purpose of driving the same.

A gear 60, slidably splined to the driven shaft 44 adjacent the rearward wall of the transmission casing, is adapted to be moved into meshing engagement with an idler gear 62, constantly in mesh with a gear 64 of the cluster of gears for the purpose of providing a reverse driving connection between the driving and the driven shafts and through the intermediary of the cluster of gears 50. Yoke 66, running in an exterior annular groove provided in the gear 60, is provided for moving the same.

A helical gear 70, secured against lateral displacement upon the driven shaft 44, is rotatably mounted thereon and in constant mesh with a helical gear 72 of the cluster of gears. Slidable gear 60 is provided with an external set of teeth 74 which are adapted to mesh with an internal set of teeth 76 provided on the helical gear 70 when the gear 60 is shifted to the left, looking at Fig. 2, for the purpose of locking the helical gear 70 to the driven shaft 44, to provide what may be termed an "emergency low" speed drive between the driving and the driven shafts and through the medium of the cluster of gears 50.

A helical gear 80, which may be termed an intermediate speed gear, is secured against lateral displacement and rotatably mounted upon a forward end portion of the driven shaft 44 and is in constant mesh with a helical gear 82 of the cluster of gears.

On the driven shaft 44 and disposed between the helical gears 70 and 80, there is located a synchronizer clutch, indicated generally at 86, which is adapted to provide one-way and two-way drives between each of said gears, respectively, and the driven shaft 44. The helical gear 70 may be considered as the low speed gear and is provided with an external radial set of teeth 78 and which may be considered as a low speed free wheeling driving clutch element. The intermediate speed helical gear 80 is provided with a rearwardly extending annular portion, upon the exterior surface of which a radial set of teeth 88 is provided, which may be considered as an intermediate speed free wheeling driving clutch element. Adjacent each of the clutch elements 78 and 88, the driven shaft 44 is provided with fixed collars 90 and 92, respectively, the peripheral surfaces of which are provided with radial teeth 94 and 96, respectively, which may be considered as low speed and intermediate speed positive driven clutch elements, respectively.

That portion of the driven shaft 44 between the collars 90 and 92 is provided with a plurality of spaced circumferential surfaces 100, eccentric with respect to the axis of rotation of the driven shaft 44. The eccentric surfaces may be formed by milling tapered recesses about the periphery of the driven shaft 44. The uncutaway portions of the driven shaft 44 between each of the eccentric surfaces 100 provide bearing surfaces upon which the inner surface of a ring 102 is adapted to slide. The inner surface of the ring 102 is adapted to cooperate with the oppositely disposed eccentric surfaces of the driven shaft 44 to provide a plurality of circumferentially spaced raceways, in each of which a spring-biased roller 104 is disposed. The rollers 104 are biased into wedging position between the surfaces of the raceways and are adapted to become wedged between the opposed surfaces of the raceways, for the purpose of locking the ring 102 to the driven shaft 44 for the purpose of driving the same.

Figures 7, 8:
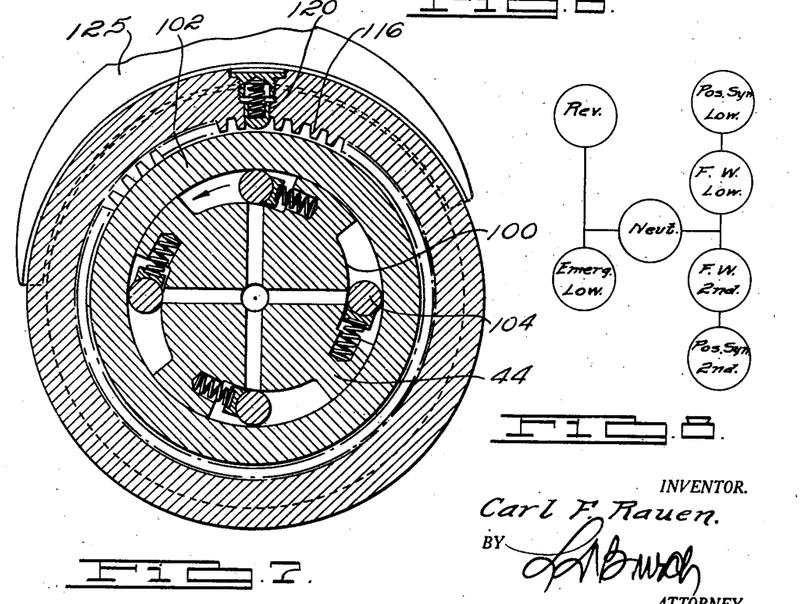
Fig. 7 is a cross sectional view taken on the line 7—7 of Figs. 2 and 9, looking in the direction of the arrows and illustrating the constructional details of the overrunning clutch which may also be considered as a part of the automatic speed changing mechanism.
Fig. 8 is a diagrammatic illustration of the various gear positions corresponding to the various positions of the handle of the gear shift lever.

When the driven shaft 44 is rotating relative to the ring 102, in the direction indicated by the arrow shown in Fig. 7, the rollers 104 will be held out of clutching position between the opposed surfaces of the raceways to permit the overrunning action just described. However, as soon as the speed of rotation of the driven shaft 44 is relatively reduced to that of the ring 102, the rollers 104 will automatically assume a wedging position between the members, so that the driven shaft 44 may be driven from the ring 102.

The ring 102 is provided with laterally extending annular portions 106 which overlie conical portions of the collars 90 and 92, respectively, and between which tapered bushings 108 are disposed. Lateral displacement of the ring 102 is adapted to wedge one of the bushings 108 between the oppositely disposed surface portions of the collars 90 or 92 and the ring 106 for the purpose of synchronizing the rotative speeds of the collar, which is connected to the driven shaft 44, and the ring 102, which may be connected to one of the helical gears 80 or 70. The object of this synchronizing action is to bring to approximately the same speeds of rotation, any two relatively rotating members which are about to be intermeshed.

A clutch sleeve 110 is slidably mounted upon the ring 102 and is provided with an internal set of teeth 112 and 114 at each end of the sleeve and an internal set of teeth 116 intermediate the extremities thereof. Looking at Fig. 2, the clutch sleeve 110 is shiftable to the left to mesh teeth 114 thereof with the intermediate speed clutch element 88, at which time the teeth 116 will be moved into engagement with an external set of teeth 118 provided upon one of the annular portions 106 of the ring 102, for the purpose of providing a one-way drive between the free wheeling clutch driving element 88 and the driven shaft 44.

The driving connection then will be through sleeve 110, teeth 116 and 118, ring 102 and rollers 104. Such a connection is adapted to provide an intermediate speed free wheeling drive between the driving and the driven shaft as the intermediate speed gear 80 is continuously driven from the driving shaft through the intermediary of the cluster of gears 50. The clutch sleeve 110 is provided with a plurality of annularly spaced spring-pressed poppets 120, projecting inwardly from the teeth 116, which are adapted to abut the side of teeth 118 externally provided on the ring 102, for the purpose of restraining further leftward movement of the sleeve 110. These poppets 120 locate the intermediate speed free wheeling position of the sleeve 110 and tend laterally to displace ring 102 for effecting the synchronization of collar 92 with gear 80 before sleeve 110 is shifted sufficiently to lock the same together. The sleeve 110 is, however, adapted to be shifted further to the left to mate teeth 116 with teeth 96, externally provided on the collar 92, for the purpose of providing a two-way drive between the intermediate speed gear 80 and the driven shaft 44. At this time the clutch sleeve 110 will lock the clutch element 88 to the collar 92. The sleeve 110 is adapted to be shifted to the right, looking at Fig. 2, to cooperate with gear 70 and collar 90 for effecting free wheeling and positive low speed drives. A yoke 125 running in an exterior groove in the sleeve 110 is provided for laterally shifting the same.

Figures 6, 15:
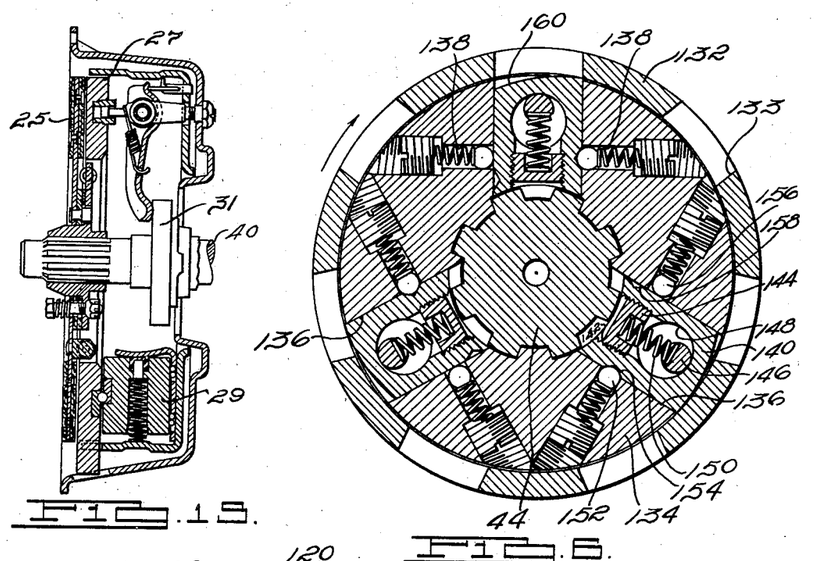
Fig. 6 is a cross sectional view taken on the line 6—6 of Figs. 2 and 9, respectively, looking in the direction of the arrows and illustrating the constructional details of the automatic clutch unit which may be considered as a part of the automatic speed changing mechanism.
Fig. 15 is a vertical longitudinal sectional view of an automatic clutch for connecting the driving shaft of the transmission to the engine crankshaft responsive to predetermined conditions of engine operation.

Between the gears 80 and 54 there is disposed an automatic clutch unit, indicated generally at 130, which comprises a part of the automatic speed changing mechanism. The automatic clutch 130 comprises a driving member 132 in the form of a drum-shaped shell suitably secured to the posterior end of the driving shaft, and a driven member 134, slidably splined to the forward end of the driven shaft 44 and in proximity to the driving member 132. Reference may be had to Fig. 6, where a cross sectional view of the automatic clutch illustrates the constructional details thereof.

The driving member 132 is provided with a plurality of circumferentially spaced openings 133. The driven member 134 comprises a cylindrical plate, in the forward face of which a plurality of radially extending grooves or slots 136 are provided. The plate 134 is also provided with a plurality of bores 138, one for each of the slots 136 and which are adapted to intercept the same at right angles thereto. Each of the slots 136 is provided with a slidable bolt 140 which is movable radially outwardly responsive to centrifugal force resulting from rotation of the driven member 134. Only one of the bolts 140 at any one time is adapted to be projected into one of the slots 133 in the driving member 132 for the purpose of locking the driving and driven members of the automatic clutch together. Each of the bolts 140 is provided with a longitudinal threaded bore 142 in which a threaded plug 144 is secured and between which and a pin 146 carried by the plate 134 and projecting into a transverse bore 148 in the bolt 140, a spring 150 is confined. The spring 150 is adapted to resist the radial outward movement of the bolt 140 and is adapted to move the bolt 140 inwardly when the centrifugal force resulting from rotation of the driven member 134 is insufficient to hold the bolt in its outward position.

Spring-pressed poppets 152 located in a portion of the bores 138 on one side of the slots are adapted to engage notches 154 in one side of the bolts 140 for restraining the outward movement of the bolts 140 responsive to centrifugal force. The spring-pressed poppets 152 have the effect of increasing the speed of rotation of the driven member 134 necessary to move the bolts 140 radially outwardly until the centrifugal force tending to move the bolt 140 outwardly is sufficiently greater than the force of the spring 150 that the bolts will be snapped to their outward position. A second set of spring-pressed poppets 156, located in an opposite portion of the bores 138, are adapted to engage notches 158 located in the opposite sides of the bolts 140 when the same are in their outward position, for the purpose of restraining inward movement of the same. This bolt has the effect of holding the bolt in its outward position until the force of the spring 150 is sufficiently larger than the centrifugal force holding the bolt outwardly, so that the bolt 140 will be snapped to its inner position.

Each of the bolts 140 is further provided with an eccentric circumferential face 160 which is adapted to cause the bolts to jump the slots 133 in the driving member 132 whenever the driving member is rotating at a rate substantially in excess of that of the driven member 134 and until the speed of rotation of the driving and the driven members is approximately the same. The driven member 134 of the clutch always will rotate with the driven shaft 44. A face plate 162 is provided which is adapted to lie over the grooves 136 for holding the bolts 140 within the grooves.

It will be noted that in the position in which the driven member 134 is shown in Fig. 2, the bolts 140 will rotate in a plane coincidental with that of the slots 133. Each of the bolts 140 is provided with a beveled edge 164 along one side thereof which is adapted to bear against a shoulder formed by the edges of the slots 133, so that when the driven member 134 is moved to the left, looking at Fig. 2, the beveled edge 164 will cam the bolt 140 to its inward position, should it be in a projected position at such time. A yoke 166, running in a groove in the driven member 134, is provided for shifting the driven member 134 to a position where the bolts 140 will underlie the drum-shaped shell 132, and consequently will be locked in, against radial outward movement.

Movement of the driven member 134 to its leftmost position, looking at Fig. 2, will move lugs 168 projecting therefrom into the slots 133, for the purpose of locking the driving and driven members of the automatic clutch together, which will effect a direct drive between the driving and the driven shafts, since each of the clutch members is connected respectively to one of the shafts. It will be noted that the automatic clutch, as shown, is in operative position; that is, the driven clutch member is in a position where it may operate if the speed of rotation of the driven shaft attains a predetermined rate, such as might be imparted to it through the coasting of a vehicle even though no gears should be in mesh at such time.

Figures 3, 4, 5:
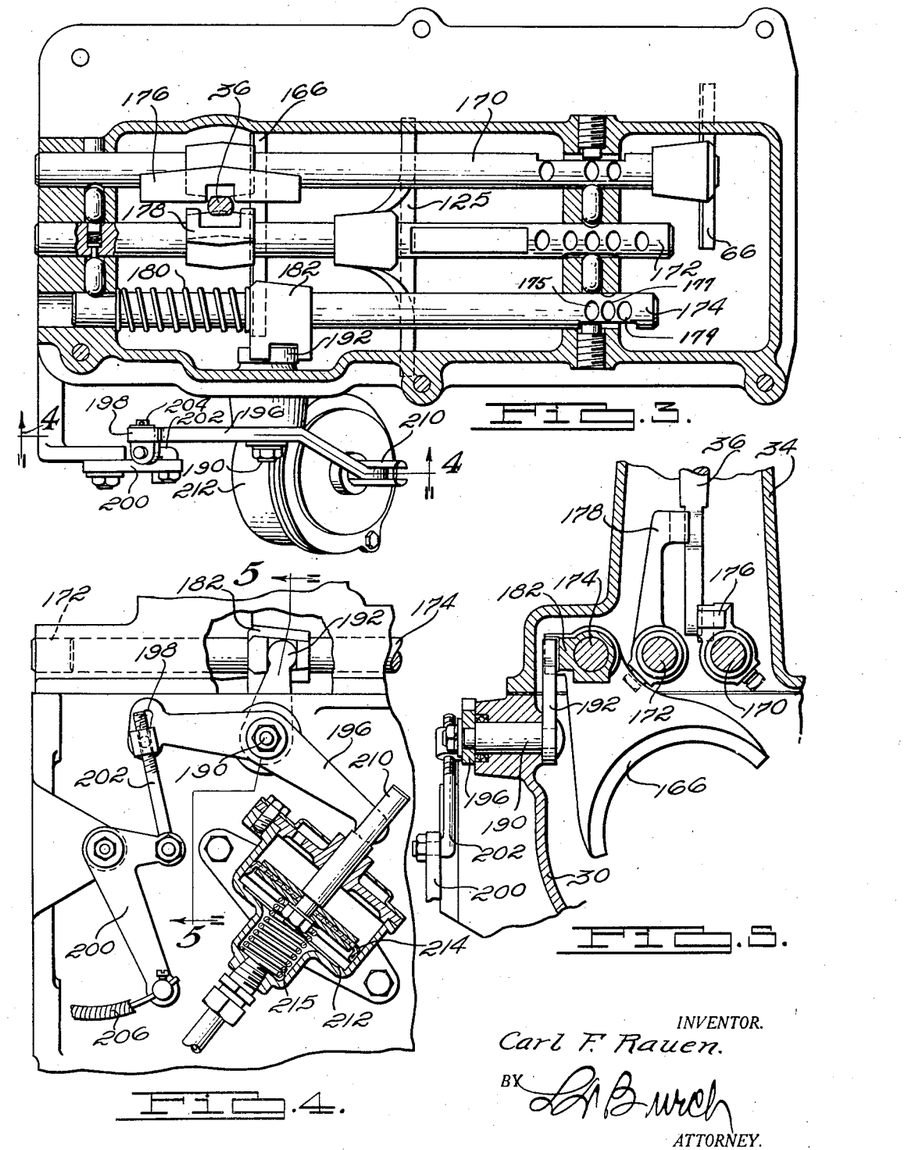
Fig. 3 is a top plan view taken on the line 3—3 of Fig. 2 and illustrating the internal mechanism for shifting the operating parts of the power transmitting mechanism illustrated in Fig. 2.
Fig. 4 is a side elevational view, partly in section, of the mechanism illustrated in Fig. 3 and taken on the line 4—4 thereof.
Fig. 5 is a cross sectional view taken on the line 5—5 of Fig. 4 and illustrating some of the constructional details of the shifting mechanism.
Figure 5:
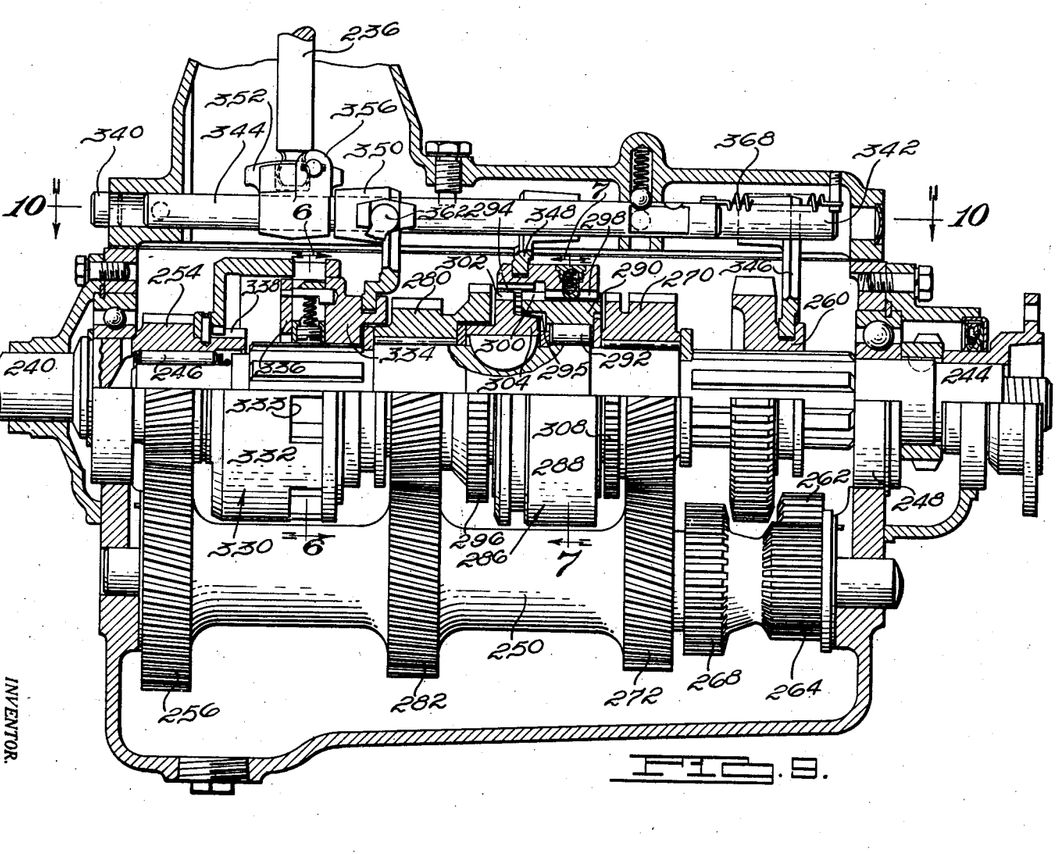

For the purpose of shifting the internal mechanism of the transmission to effect various drives between the driving and the driven shafts, there is provided in the cover plate 32, a plurality of longitudinally slidable yoke rods 170, 172, and 174. Yoke rod 170 is provided with a gate 176 adapted to receive the bottom end of shift lever 36, which is provided for shifting the gear 60 to effect a low and a reverse drive connection between the driving and the driven shafts. Yoke 125 is carried by yoke rod 172 which is provided with a gate 178 also adapted to be engaged by a bottom portion of the shift lever 36 for the purpose of shifting the clutch sleeve 110. Because of the braking action produced by the lateral displacement of the ring 102 upon shifting of the clutch sleeve 110, it is desirable to use a greater force than that which ordinarily would be created, and to that end the gate 178 engages the yoke rod 36 closer to its fulcrum than does the gate 176. For this reason, a relatively large amount of force may be applied to the parts of the clutch unit 86 for the purpose of synchronizing the speed of the members about to be engaged.

Yoke rod 174 which carries the yoke 166 is biased to the right, looking at Fig. 3, by a spring 180 confined between a transverse wall of the cover and a collar 182 which carries the yoke 166. Since the driven member 134 of the automatic clutch 130 normally is in operative position, ordinarily it will be sufficient for the purpose of initiating a forward movement of the vehicle in which the transmission may be incorporated, to provide a drive between either of the gears 70 or 80, respectively, and the driven shaft 44. The gear 70 may be locked to the driven shaft 44 for the purpose of driving the same in a plurality of ways. If the handle of the gear shift lever 36 is moved to the "Emergency low" position indicated in Fig. 8, the gear 60 will be shifted to the left, looking at Fig. 2, to mate teeth 74 with teeth 76 of gear 70 to provide a positive or two-way drive between the driving and the driven shafts and through the intermediary of gear 72 of the counter-shaft which is in mesh with gear 70, and gear 56 of the cluster of gears, which is in mesh with gear 54 on the driving shaft. If the drive is initiated in this manner, the automatic clutch cannot become operative to provide a direct drive between the shafts, since, as previously pointed out, the bolts 140 will continue to jump the slots 133 in the driving member 132 until the speeds of the driving and driven members are approximately the same.

When the driven shaft 44 is locked to the gear 70 through the medium of the gear 60, the driven shaft 44 will always rotate at the same ratio with respect to the speed of the driving shaft 40. Consequently, the speed of rotation of the driving and driven members of the automatic clutch cannot be the same. It will be noted that the emergency low position is directly opposite that of the reverse position. This will render it convenient for the operator of the vehicle when moving the car back and forth, such as sometimes occurs when parking the vehicle, to change readily from one drive to the other.

The gear 70 may also be locked to the driven shaft 44 for the purpose of driving the same, by shifting the clutch sleeve 110 to the right, looking at Fig. 2, to a position where teeth 112 of the clutch sleeve 110 are mating with teeth 78 of the gear 70, at which time the teeth 116 of the clutch sleeve 110 will be moved into engagement with the teeth 118, externally provided on the ring 102, at which time a one-way low speed drive will be provided which will permit the driven shaft 44 to overrun, whereby the speeds of rotation of the driving and driven members of the automatic clutch 130 may be approximately synchronized. Whenever approximate synchronization of the speeds of rotation of the driving and driven members of the automatic clutch takes place, one of the bolts 140 will be projected into one of the slots 133, assuming that the centrifugal force resulting from rotation of the driven shaft 44 is sufficient to move the bolts outwardly. Whenever one of the bolts 140 lock the driving and driven members of the automatic clutch together for the purpose of providing a direct positive drive between the shafts, the low speed gear 70 will become inoperative to drive the driven shaft, which will overrun the same.

The positive direct drive will continue through the automatic clutch 130 until the speed of rotation of the driven member falls below a predetermined rate, at which time if the torque between the projected bolt 140 and the driving member 132 is released, the bolt 140 will move inwardly to break the direct driving connection, whereupon the low speed gear 70 will again become operative to drive the driven shaft 44.

The gear 80 may similarly be connected to the driven shaft 44 by shifting the clutch sleeve 110 to the left looking at Fig 2, to a position where teeth 114 of the sleeve 110 will engage teeth 88 of the intermediate speed gear 80, at which time the teeth 116 of the clutch sleeve 110 will be moved into engagement with the teeth 118 externally provided on the ring 102. An automatic change in the ratio of the driving connection may be made from the intermediate speed free wheeling drive to a direct drive, in the same manner as an automatic change is made from the free wheeling low speed drive, the only difference being that the gear 70 provides a lower ratio driving connection between the driving and driven shafts than does the intermediate speed gear 80.

If the clutch sleeve 110 is shifted to its extreme right and left hand positions, looking at Fig. 2, to provide either an intermediate or a low speed positive drive between the driving and the driven shafts, the automatic clutch unit cannot operate, and hence the transmission will remain set in the driving position in which it is placed. The positive synchronized low position may be effected by moving the handle of the gear shift lever to the corresponding position indicated in Fig. 8. A change from a free wheeling low to a positive synchronized low or from a free wheeling second to a positive synchronized second speed drive connection may be effected without disengaging the main engine clutch 24, if the speed of rotation of the driven shaft 44 is below that at which the dogs 140 normally would be moved outwardly and if the driven shaft at such time is not overrunning. If, however, one of the dogs 140 has been projected to engage one of the slots 133, it will be necessary before shifting the clutch ring 110 to provide a positive either low or intermediate speed drive to break the connection between the members of the automatic clutch 130. To that end, there is provided auxiliary control means whereby the driven member 134 of the automatic clutch may be moved to a position where the bolts will be inoperative to lock the driving and driven members of the automatic clutch together.

As shown in Figs. 3, 4, and 5, auxiliary control means are provided for shifting the driven member 134 of the automatic clutch. A shaft 190 is rockably mounted in the side wall of the transmission casing and is provided on its end which projects within the transmission casing 30 with an arm 192, the free end of which engages a gate 194 provided in the collar 182. The external end of the shaft 190 is provided with a rocker arm 196, having a slotted end 198. A bell crank 200, suitably secured to the side wall of the transmission casing, carries a rod 202 at one end which is provided with a pin 204 which is slidably connected to the slotted end 198 of the rocker arm 196. The opposite end of the bell crank 200 may be connected to a Bowden wire 206 which leads to a control which may be positioned on the instrument board in the driver's compartment of the vehicle.

One end of the rocker arm 196 may be connected to a piston rod 210 projecting from a vacuum cylinder 212, which may be connected through a valve-controlled passageway to a suitable source of suction. A piston 214, fixed to the piston rod 210, is mounted within the cylinder 212 and biased by a spring 215 to a position opposite to that shown in Fig. 4 of the drawings. The valve controlling the application of suction to the piston 214 is so arranged that whenever the engine is operating, the piston 214 will be in the position in which it is shown in Fig. 4 of the drawings except as hereinafter explained. Thus, whenever the engine is not operating or is running on a wide open throttle, the spring 215 will be operative through the piston rod 210, rocker arm 192, which engages collar 182, and yoke 166 to shift the driven member 134 of the clutch to the left, looking at Fig. 2, to a position where the bolts 140 will underlie the drum portion of the driving member 132, at which time the automatic clutch will be inoperative to effect a change in the driving connection.

On account of the short travel of the piston 214, the spring 215 can not operate to shift the driven member 134 of the clutch to a position where the lugs 168 thereon may engage the slotted openings 133 provided in the driving member 132 of the clutch. Referring to Fig. 3, it may be observed that the shift rod 174 at the right hand end thereon is provided with a plurality of notches 175, 177, and 179, one of which at a time is adapted to be engaged by a spring pressed poppet (not shown) such as that shown at 181 engaging the notches in the shift rail 172 in Fig. 2, and for the purpose of locating the various positions of the shift rail 174. In the position in which the parts are illustrated in Fig. 3, the notch 175 will be engaged by the spring pressed poppet referred to, and it will be observed that in this position of the shift rail 174, the driven member 134 of the clutch unit is in position where the bolts 140 underlie the slotted openings 133 in the drum 132. When the shift rail 174 is moved to the left so that the notch 177 therein will be engaged by the spring pressed poppet, the driven member 134 of the clutch will be in a position where the bolts 140 will underlie a continuous rim portion of the drum 132. When the shift rail 174 is in its leftmost position so that the notch 179 therein will be engaged by the spring pressed poppet, the lugs 168 on the driven member 134 of the clutch will engage the slotted openings 133 in the drum 132.

The dash control, to which the Bowden wire 206 is connected and which is diagrammatically illustrated in Fig. 1, may be manually operated at any desired time for shifting the driven member 134 of the automatic clutch to an inoperative position where the bolts 140 will underlie a continuous portion of the driving member 132 and for further shifting the driven member 134 to a position where the lugs 168 thereof will engage within the slotted openings 133 in the driving member 132.

A valve construction of the type illustrated in Figs. 10 to 14 may be used, if desired. The construction and operation of the valve control shown in these figures will be described in connection with the modification of the invention illustrated in Fig. 9.

Whenever a free wheeling drive is provided between either the gear 70 or the gear 80 and the driven shaft 44, the automatic speed changing mechanism including the automatic clutch 130 will be operative for changing the driving ratio between the shafts responsive to speed control of the driven shaft 44. As soon as the speed of rotation of the driven shaft 44 is accelerated to a rate at which the bolts 140 tend to move outwardly, an automatic change in the ratio from a reduced rate of speed to a direct drive may be made, through the automatic clutch 130, by a momentary closing of the throttle governing the speed of the engine, which will permit the driving shaft 40 and clutch member carried thereby to decelerate relative to that of the driven shaft 44 until the speeds of rotation of the automatic clutch members are substantially the same, at which time the members of the automatic clutch unit will be locked together, whereupon the drive between the shafts, as soon as the throttle governing the speed of the engine subsequently is opened, will be through the automatic clutch 130.

The driven member 134 of the automatic clutch may be shifted to a position by manipulation of the dash control, where the lugs 168 will engage the notches 133 in the driving member 132 for the purpose of locking the members of the automatic clutch together. This may be desirable where a continued drive in high gear is desired, or where it might be desirable to start the engine of the vehicle by pushing of the same. At such time the automatic clutch 130 will be inoperative to change the ratio of the driving connection between the driving and the driven shafts. It will thus be seen that for normal driving, a single gear position will be sufficient, and the operator of the vehicle will not be required to manipulate the shift lever other than initially to select a gear or driving connection for starting of the vehicle.

The auxiliary dash control provides the operator with a means whereby a change in the driving ratio may be effected without regard to the speed of rotation of the driven shaft, and at such times as it might be desirable. In this manner, the operator of the vehicle may effect a change in the driving connection from an automatic direct drive to a reduced drive merely by manipulation of the dash control and momentary closing of the engine throttle to release the torque between the gears of the transmission, even though the speed of the vehicle may be above that at which the automatic change from an automatic direct drive to a reduced drive might be effected.

Having reference now to Fig. 9 of the drawings, there is shown a transmission embodying a modification of the invention in which four forward driving speeds are provided. In this modification of the invention, the driving shaft 240 is provided with a helical gear 254 which constantly meshes with a helical gear 256 of a cluster of gears 250. The driven shaft 244 is journaled at its forward end in a roller bearing 246 secured in a counterbore in the posterior end of the driving shaft and at its rearward end in a bearing 248 suitably secured in the rearward wall of the transmission casing. A helical gear 270 which may be called a low speed gear, is secured against lateral displacement upon the driven shaft 244 and is constantly in mesh with a helical gear 272 of the cluster of gears. A helical gear 280, rotatably journaled upon the driven shaft 244 and secured against lateral displacement thereon, constantly meshes with a helical gear 282 of the cluster of gears. Adjacent the rearward end of the driven shaft 244 a gear 260 is slidably splined, which is adapted to be moved into engagement with a gear 268 provided by the cluster of gears and with an idler gear 262 which is in constant mesh with a gear 264 of the cluster of gears. A yoke 266 is provided for shifting the gear 260 upon the driven shaft 244 and into engagement with the gear 268 to provide what may be termed an emergency low speed drive between these shafts and through the intermediary of the cluster of gears 250 and the helical gear 254.

Disposed between the helical gears 270 and 280, the driven shaft is provided with a clutch unit 286 which comprises a shiftable sleeve 288, a ring 290, and a plurality of rollers 292. The construction of this clutch unit is quite similar to that illustrated in Fig. 7 and the cross sectional view of which corresponds with that illustrated in Fig. 7. Sleeve 288 is provided with an internal set of teeth 294 which are adapted to mate with an external set of radial teeth 296 provided on the intermediate speed gear 280, and with a second internal set of teeth 298 which, as shown, are mating with an external set of radial teeth 300 provided on the ring 290.

Shifting of the sleeve 288 to the left, looking at Fig. 9, is adapted to mate teeth 294 thereof with teeth 296 of the intermediate speed gear 280 and subsequently to mate teeth 298 with a set of teeth 302 externally provided on a collar 304, rigidly affixed to the driven shaft 44, for the purpose of locking the gear 280 to the driven shaft to drive the same. Sleeve 288 is adapted to be shifted to the right, looking at Fig. 9, for the purpose of mating teeth 298 with an external set of teeth 308 provided on the low speed gear 270 to provide a one-way drive between said gear and the driven shaft. A tapered bushing 295 is adapted to be wedged between the ring 290 and collar 304 to provide a synchronizing action between the sleeve 288 and the collar 304 prior to locking the same to the intermediate speed gear 280.

An automatic clutch 330, comprising a drum-shaped driving member 332 having a plurality of circumferential equidistantly spaced slots 333, and a driven member 334 slidably splined to the forward end of the driven shaft 244, is disposed between the helical gears 254 and 280. A cross section through the automatic clutch embodied in the transmission illustrated in Fig. 9 corresponds with the view shown in Fig. 6. The driven member 334 of the automatic clutch is provided with an internal set of teeth 336 which are adapted to be mated with an external set of teeth 338 provided upon the posterior end of the driving shaft for the purpose of locking the driving and driven shafts directly together. The clutch member 334 is adapted to be progressively shifted to the left, looking at Fig. 9, first, to move the centrifugally operable bolt to an inoperative position beneath the rim of the drum 332, and subsequently to lock the driven shaft 244 directly to the driving shaft 240. The arrangement of yoke rods which may be used for shifting the internal mechanism of the transmission illustrated in Fig. 9 may correspond quite closely to that illustrated in Fig. 3.

Figure 10:
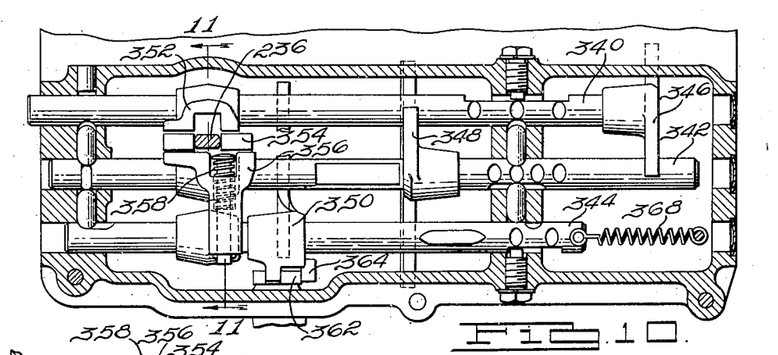
Fig. 10 is a top plan view taken on the line 10—10 of Fig. 9, and illustrating the internal mechanism for shifting the operating parts of the power transmitting mechanism illustrated in Fig. 9.

Having reference to Fig. 10 where the details of such a mechanism are illustrated, there is provided a plurality of yoke rods 340, 342 and 344, each of which is provided with a shift fork 346, 348 and 350, respectively. Shift fork 346 is adapted for shifting gear 260 into mesh with gear 268 to provide an emergency low speed drive between the driving and the driven shafts. The ratio provided by this gear hook-up is extremely low and need not be used except under extreme conditions. The shift fork 346 is also adapted to move the gear 260 into mesh with idler gear 262 to provide a reverse driving connection between the shafts. Yoke rod 348 is adapted to shift clutch sleeve 288 either to the right or to the left, looking at Fig. 9. Movement of the clutch sleeve 288 to the left, to mate teeth 294 and 296, is adapted to provide a free wheeling intermediate speed drive between the driving and the driven shafts.

If the driven member 334 of the automatic clutch is in position where it may operate, movement of the vehicle may be initiated through the free wheeling intermediate speed drive provided by the hook-up just referred to, and an automatic change in the driving connection to a high speed drive will be effected, whenever the speed of rotation of the driven shaft 244 attains a predetermined rate and upon approximate synchronization of the speeds of rotation of the driving and driven members of the automatic clutch 330, such as by a momentary closing of the engine throttle. The movement of the vehicle may also be initiated by means of a driving connection through the gear 270 when the clutch sleeve 288 is moved to the right, looking at Fig. 9, to mate teeth 298 with teeth 308 of the low speed gear 270, and an automatic change from that driving connection to a direct high speed driving connection will be effected in the same manner as a change is provided from the driving connection through the intermediate speed gear 280.

Shift fork 350, controlling the shifting of the driven member 334 of the automatic clutch, may be moved either manually or by means of a vacuum cylinder and piston, similar to that illustrated in Fig. 4. Yoke rod 340 is provided with a gate 352, which is adapted to be engaged by the bottom end of the gear shift lever 236 for the purpose of moving the yoke rod 340 and yoke 346 carried thereby for effecting emergency low and reverse driving connections. The shift lever 236 is adapted to engage with a gate 354 in yoke rod 342 for moving yoke 348 which is used for selecting the drive between the gears 270 and 280 and the driven shaft 244. Yoke rod 344 is provided with a gate 356 which lies in proximity to the gate 354 and which normally is closed by a spring-pressed pin 358. It will be noted that the gate 356 is offset with respect to the gate 350, so that shift lever 236 cannot enter the gate 356 from the position in which the transmission is shown. Under some conditions the yoke rod 344 and yoke 350 carried thereby may be shifted by manipulation of the shift lever 236.

A bell crank lever 360, having an arm 362 operable within the transmission casing which engages a fork 364 provided on the yoke rod 344, is held in engagement with a piston rod 366 projecting from a vacuum cylinder by a spring 368 which biases the yoke rod 344 to the right, looking at Fig. 10. The vacuum cylinder 370 may be identical with that illustrated in Fig. 4 and is connected through a valved conduit 372 to a suitable source of suction. A hollow valve body 374 may be suitably supported such as by securing the same to the steering column of an automotive vehicle and is adapted to receive a valve plunger 376 for controlling the application of suction to the vacuum cylinder 370.

Figures 11, 12:
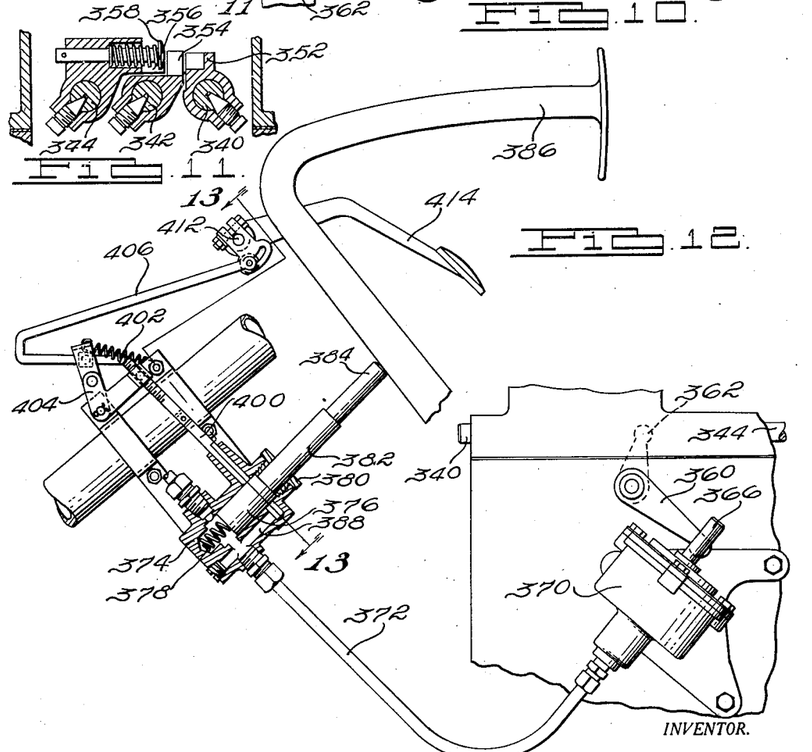
Fig. 11 is a detail view of the mechanism illustrated in Fig. 10 on the line 11—11 thereof.
Fig. 12 is a more or less diagrammatic view of the auxiliary control mechanism for the transmission illustrated in Fig. 9.
Figures 13, 14:
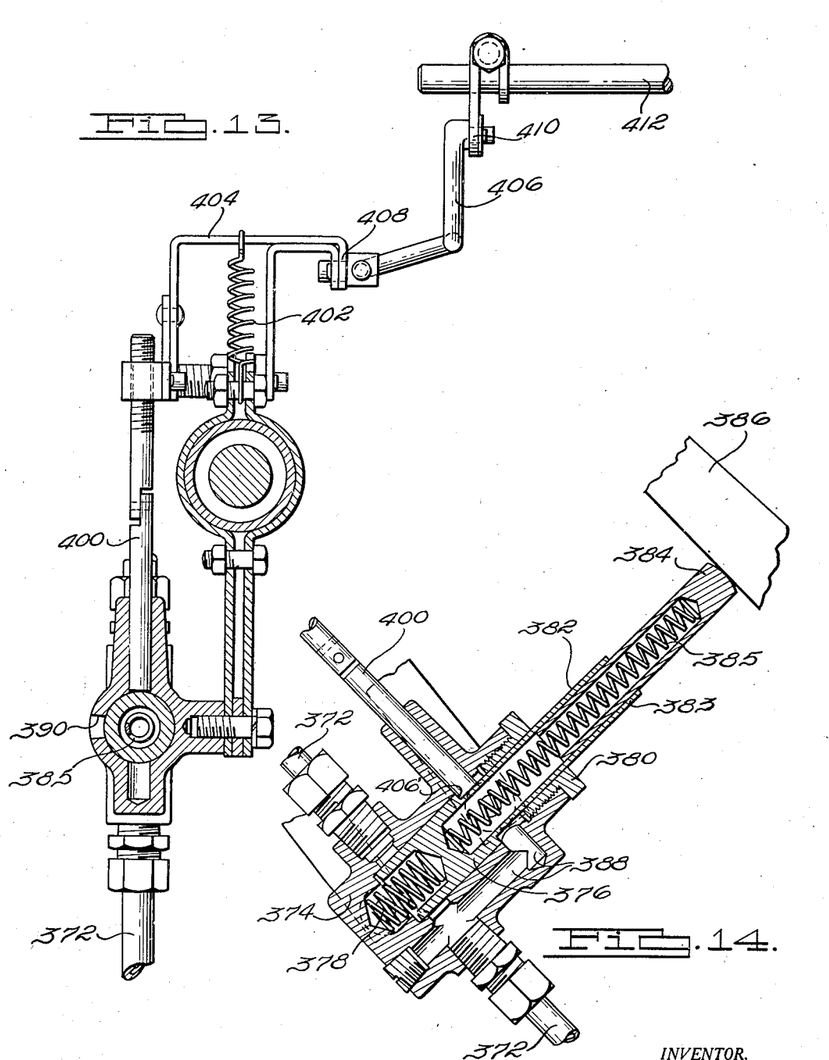
Fig. 13 is a cross sectional view of the mechanism illustrated in Fig. 12 and taken on the line 13—13 thereof.
Fig. 14 is an enlarged view, partly in section, of a portion of the mechanism illustrated in Fig. 12.

Valve plunger 376 is biased by a spring 378 confined between the plunger and an end wall of the valve body 374 to a position where the vacuum cylinder 370 is in communication with a source of vacuum. The valve plunger 376 is confined within the valve body 374 by a bushing 380 threadedly secured in the open end of the valve body and around a plunger shaft 382 which comprises extensible telescopic sections 383 and 384 which are biased apart by a spring 385. Plunger member 384 is adapted to be engaged by a pedal 386, such as the brake or clutch pedal which extends within the driver's compartment of an automotive vehicle, for the purpose of closing the valve and breaking the suction line to the vacuum cylinder 370. The valve body 374 is provided with a passageway 388, intercepting the vacuum conduit 372 and which is adapted to be placed in communication with the atmosphere when the vacuum line is closed. To this end, the valve plunger 376 is reduced adjacent the rearward end thereof, so that when the plunger is in closed position, an annular passageway around the plunger shaft 383 will be provided, which is open to the atmosphere through a vent 390. This vent is provided to enable the vacuum cylinder quickly to be filled with air upon closing of the vacuum conduit, to permit the spring such as spring 215, shown in Fig. 4, to move the piston and piston rod 210 to outward position.

The spring 385 is stronger than the spring 378, so that when the pedal 386 is depressed, the initial movement of the pedal will be sufficient to break the application of suction to the vacuum cylinder 370. The telescopic arrangement of the plunger shaft permits the pedal further to be depressed without affecting the position of the valve plunger 376, such movement being desirable to effect application of the brakes or to break the driving connection to the main engine shaft. The vacuum cylinder and piston are so connected to the yoke governing the shifting of the driven member of the automatic clutch unit that when vacuum is not applied to the piston, the spring 215 biasing the piston will operate to shift the driven member of the clutch to its inoperative position. Thus, when the engine is at rest, there will be no suction, and consequently the driven member of the automatic clutch unit will be shifted to inoperative position. Likewise, when pedal 386 is depressed, the vacuum line will be broken and the driven member of the automatic clutch unit will be shifted to inoperative position.

It will be remembered that the shifting of the driven member of the automatic clutch unit to inoperative position will be effective for changing the driving connection between the shafts from an automatic high direct drive to a free wheeling second drive or to a position where the automatic clutch will be entirely inoperative to effect a change in the driving connection between the shafts, depending upon the particular condition of operation of the vehicle. If the yoke rod 344 carrying the yoke 350, which controls the shifting of the driven member of the automatic clutch is spring-biased to the right by spring 368, it will be apparent that if the engine is operating and the pedal 386 is returned to its normal position, the vacuum cylinder 370 will be opened to the application of suction.

For the purpose of holding the valve controlling the application of suction to the vacuum cylinder 370 in a closed position, there is provided a latching means comprising a latch 400 which is adapted to engage a shoulder 406' provided on the reduced portion of the plunger 376 when the plunger is in closed position, for the purpose of holding the same in such position until it is subsequently released. Spring 402, secured at one end to a bracket on the steering column, is hooked to one arm of a bell crank 404 pivoted to a bracket on the steering column, and the other end of which is secured to an end of the latch 400 for the purpose of biasing the same into locking position.

A rod 406 is pivotally connected as at 408 to one arm of the bell crank 404 and at the other end by a pin and slot connection 410 with a shaft 412 connected to the throttle control 414. The connection is such that the initial depression of the throttle control 414 will not affect the rod 406, but a depression to a wide open position will move the rod 406 to pivot the bell crank 404 about its pivot, thereby to release the plunger 376 from engagement with the latch 400. Thus, the vacuum valve will, when closed by manipulation of pedal 386, remain closed, with the result that the driven member of the automatic clutch unit will remain in its inoperative position until the latch 400 is released by depressing the throttle control 414 to a wide open position. Thus, after a change in the driving connection has been made from an automatic direct drive to a free wheeling intermediate speed drive, the drive will continue in free wheeling intermediate until the throttle control 414 is depressed to a position corresponding to wide open throttle.

It will be seen, therefore, that two different methods of effecting an automatic shift from a direct high speed drive to an intermediate speed drive are provided, the one operable whenever the speed of rotation of the driven shaft attains a predetermined minimum rate, whereby the centrifugal bolt will be collapsed to break the driving connection between the clutch members, and the other accomplished by a slight depression of the pedal 386, which will shift the driven member of the automatic clutch to an inoperative position.

The main engine clutch 24 will become effective at or about the speed at which an automatic change from a direct drive to an intermediate drive is made for disconnecting the engine crank shaft from the driving shaft 40, thereby to release the torque between the members of the automatic clutch 130 whereby a change to a reduced driving ratio may be effected. The release of torque between the driving and driven members of the automatic clutch 130 relieves the drag of the car upon the engine when the same is decelerated faster than the vehicle.

When the engine is at rest, the spring opposing the vacuum cylinder will become effective for shifting the driven member of the automatic clutch 130 to an inoperative position; that is, to a position where the bolts 140 will underlie the rim of the driving member 132, with the result that gate 356 will be brought into alignment with gate 354 whereby yoke rod 344 may be shifted to its extreme leftmost position to mate teeth 336 on member 344 with teeth 338 provided on the end of the driving shaft and for the purpose of providing a locked-up direct high speed drive between the driving and the driven shafts. It will also be possible to effect a locked-up high speed direct drive between the shafts; that is, to change from an automatic drive, either in low or in high speed, to a locked-up drive by moving the shift lever 236 into engagement with gate 356 which may be done when the transmission is set for automatic position in free wheeling low since the gate 354 will have been moved to the right, looking at Fig. 10, to mate clutch member 288 with the low speed gear 270 for initiating the movement of the vehicle so that gates 354 and 356 will coincide, which will permit shift lever 236 to move yoke rod 344 for the purpose of shifting the driven member of the automatic clutch to a position where a high speed locked-up drive will be provided between the shafts.

It will be evident that when the engine throttle is open, there will be insufficient vacuum in the intake manifold to hold the piston in the vacuum cylinder in position against the tension of the spring, with the result that the spring will tend to shift the driven member of the automatic clutch to an inoperative position. If the vehicle is being driven in automatic second gear, the driven member of the automatic clutch will be shifted to an inoperative position, with the result that the bolts 140 of the driven member of the automatic clutch will not at that time have to jump the slots provided in the driving member of the automatic clutch, but on the other hand will ride on the smooth internal surface of the shell portion of the driving member. However, just as soon as the throttle governing the engine speed is closed, the driven member of the automatic clutch will be shifted back to operative position where one of the bolts may be projected outwardly, as heretofore described. If, during the time when the engine throttle is wide open, the car is being driven in automatic high gear, the torque between the driving and driven members of the automatic clutch and the bolts connecting the same will be sufficient to hold the bolts in their outward position and prevent the spring opposing the vacuum piston from shifting the driven member of the automatic clutch to an inoperative position.

The provision of an automatic main engine clutch provides the equivalent of a free wheeling shift which will enable the operator of the vehicle to make selective changes in the gear ratio whenever the engine throttle is cut, without the necessity of manually disengaging the clutch by means of a pedal such as 386.

While several specific embodiments of my invention have been illustrated and described, it must be appreciated that many modifications may be made in the construction thereof without departing from the scope of the invention, and for that reason I do not desire to be limited to any particular form or arrangement except in so far as such limitations are included in the following claims.

I claim:

1. In a device of the class described, the combination of a driving shaft, a driven shaft, a plurality of gears rotatably mounted on said driven shaft and adapted to be driven at different rates of speed by said driving shaft, over-running clutch means connected to said driven shaft and selectively engageable with each of said gears to provide a free wheeling drive between said shafts, manipulative means for shifting said clutch means to select one of said gears through which to initiate rotation of said driven shaft, and an automatic clutch having a member connected to each of said shafts respectively and being operable responsive to speed control of said shafts for subsequently providing a direct driving connection between said shafts.

2. A variable speed power transmitting mechanism having in combination a driving shaft having an automatic clutch element thereon, a driven shaft, a plurality of gears rotatably mounted thereon and adapted to be driven at different rates of speed by said driving shaft, over-running clutch means connected to said driven shaft and selectively engageable with each of said gears to provide a free wheeling drive between said shafts, selective means for shifting said clutch means into engagement with either of said gears to initiate the rotation of said driven shaft at a rate of speed reduced with respect to that of said driving shaft, and centrifugal force responsive means carried by said driven shaft and cooperable with said clutch element for connecting said driven shaft to said driving shaft to continue the rotation of said driven shaft at a rate of speed synchronous with respect to that of said driving shaft.

3. A variable speed power transmitting mechanism for providing a plurality of driving connections between the road wheels of a vehicle and the engine thereof having in combination a driving shaft adapted to be driven by the engine of a vehicle, a driven shaft connected to the road wheels of a vehicle for driving the same, change speed gearing adapted to provide a plurality of driving connections between said shafts, speed control responsive clutch means operatively associated with said shafts for effecting automatic changes in the driving connection between said shafts, and means controlled by the operation of the engine of the vehicle for positively locking said speed control responsive means against operation when the engine is at rest.

4. A variable speed power transmitting mechanism for providing a plurality of driving connections between the road wheels of a vehicle and the engine thereof, having in combination a driving shaft adapted to be driven by the engine of a vehicle, a driven shaft connected to the road wheels of a vehicle for driving the same, a clutch element fixed for rotation to the driving shaft, a second clutch element slidably mounted on said driven shaft and adapted to rotate therewith, means connecting said shafts around said clutch elements for providing an initial driving connection between said shafts, centrifugal means carried by said driven shaft clutch element and operatively engageable with said driving shaft clutch element for coupling said clutch elements for rotation together, a spring operable for shifting said driven shaft clutch element to an inoperative position, and means operable in response to engine operation for controlling the operation of said spring.

5. In a variable speed power transmitting mechanism, the combination of driving and driven shafts adapted to be interconnected in a plurality of driving connections, gearing for interconnecting said shafts to initiate the rotation of said driven shaft at a reduced rate of speed, means responsive to predetermined conditions of operation of said shafts for automatically effecting changes in the driving connection therebetween from a reduced to a direct ratio and from a direct to a reduced ratio, manually controlled means operable for selectively effecting changes in the driving connection between said shafts without regard to the conditions of operation of said shafts, and means operable for locking said automatic changing means against operation incidental to a selective change in the driving connection.

6. A variable speed power transmitting mechanism having in combination driving and driven shafts, a plurality of gears rotatably mounted on said driven shaft and adapted to be driven at different rates by said driving shaft, a clutch unit mounted on said driven shaft and disposed between said gears and having a shiftable member adapted to provide respectively one-way and two-way drives between each of said gears and said driven shaft, an automatic clutch having a driving member on the driving shaft, a driven member on the driven shaft, and means operable responsive to predetermined conditions of rotation of said shafts at such time as a one-way driving connection is provided between one of said gears and said driven shaft for interconnecting said members to provide a direct drive between said shafts, and manipulative means for selecting a drive between one of said gears and said shafts to initiate rotation of said driven shaft.

7. A variable speed power transmitting mechanism having in combination driving and driven shafts, a plurality of gears rotatably mounted on said driven shaft and adapted to be driven at different rates by said driving shaft, a clutch element on each of said shafts and adapted to be interlocked to provide a direct drive between said shafts, automatic means carried by said driven shaft clutch element and operable responsive to predetermined conditions of rotation of said shafts for automatically interconnecting said clutch elements, selectively engageable clutch means on said clutch elements, clutch means carried by said driven shaft and adapted selectively to be engaged with said gears to provide one-way and two-way drives between said shafts and through each of said gears, respectively, manipulative means to shift said clutch means into engagement with a selected one of said gears to provide an initial one-way drive between said shafts whereby said automatic means will be operable progressively to effect a direct drive between said shafts, said clutch means being shiftable into engagement with a selected one of said gears to provide an initial locked-up drive between said shafts whereby a change to a direct drive between said shafts may be effected by a selective shift of said driven shaft clutch element to lock the same to said driving shaft clutch element.

8. A variable speed power transmitting mechanism having in combination driving and driven shafts, a plurality of gears rotatably mounted on said driven shaft and adapted to be driven at different rates by said driving shaft, clutch means for selectively connecting each of said gears, respectively, to said driven shaft, manipulative means for shifting said clutch means into operative engagement with a selected one of said gears to initiate rotation of said driven shaft, and means associated with said shafts progressively operable responsive to speed control of said shafts for automatically changing the ratio of the driving connection therebetween by effecting a direct drive between said shafts whereby said driven shaft will overrun said selected gear so long as said direct drive exists, said selected gear being operable to continue the drive between said shafts whenever said direct drive is automatically broken, said manipulative means being operable for selecting another of said gears whenever said direct drive exists whereby said last mentioned gear will be operable to continue the drive between said shafts whenever said direct drive is automatically broken.

9. A variable speed power transmitting mechanism for providing a plurality of driving connections between the engine of a vehicle and the road wheels thereof having in combination a driving shaft adapted to be driven by the engine of the vehicle, a driven shaft connected to the road wheels of a vehicle for driving the same, clutch means having a member connected to each of said shafts, respectively, and adapted to be automatically interconnected under predetermined conditions of rotation of said shafts to provide a direct driving connection therebetween, manually controlled means for providing a reduced one-way driving connection between said shafts to initiate the rotation of said driven shaft, means controlling the rotation of said shafts and operable for effecting the predetermined conditions of rotation thereof whereby said clutch means may effect a direct driving connection between said shafts, other means operable at any time for locking out said clutch means whereby a locked-up reduced driving connection will be provided between said shafts, said means controlling the rotation of said shafts being operable for optionally releasing said clutch means.

10. A transmission having in combination driving and driven shafts with instrumentalities for controlling the speeds thereof, a gear rotatably mounted on said driven shaft and adapted to be driven through a train of gearing from said driving shaft, a clutch carried by said driven shaft and shiftable for selectively effecting a one-way or a two-way drive between said gear and said driven shaft, manipulative means for shifting said clutch to effect a one-way drive for initiating rotation of said driven shaft, an automatic clutch operable responsive to speed control of said shafts at such time as said one-way drive is provided for effecting a direct drive therebetween, vacuum responsive means for cutting out said automatic clutch for rendering operative said one-way drive between said shafts and through said gear, and means associated with the instrumentalities controlling the speed of said shafts operable for releasing said automatic clutch.

11. In a transmission, the combination of driving and driven shafts, a gear rotatably mounted on said driven shaft and connected through a train of gears to said driving shaft, a clutch mounted on said driven shaft and shiftable for selectively effecting a one-way or two-way drive between said gear and said driven shaft, manipulative means for shifting said clutch to select a one-way drive to initiate rotation of said driven shaft at a reduced rate, an automatic clutch having a member for each of said shafts, respectively, with means operable at such time as a one-way initial drive is provided for connecting said members, said means being operable responsive to speed control of said shafts for effecting a change in the driving connection therebetween to a direct drive, vacuum responsive means for shifting one of said members to lock out said automatic clutch for rendering operative said one-way drive through said gear, said manipulative means being operable for shifting said clutch to effect a locked-up two-way drive between said shafts and through said gear.

12. In a transmission for providing a plurality of drives between the engine of a vehicle and the road wheels thereof, the combination of a driving shaft adapted to be driven by the engine of the vehicle, a driven shaft connected to the road wheels of a vehicle for driving the same, an automatic clutch operable responsive to speed control of said shafts for effecting a direct drive therebetween and comprising a member associated with the driving shaft, a driven member slidably mounted on said driven shaft, means biasing said driven member into an inoperative position, and means directly responsive to the condition of operation of the engine for holding said driven member in position where it may be effective for providing a direct drive between said shafts.

13. In a power transmitting mechanism for providing a variable speed driving connection between the engine and the road wheels of a vehicle, the combination of a driving shaft adapted to be driven by the engine of the vehicle, a driven shaft connected to the road wheels of a vehicle for driving the same, an automatic clutch operable responsive to speed control of said shafts for effecting a direct drive therebetween and comprising a member associated with the driving shaft, a driven member slidably mounted on said driven shaft, a spring biasing said driven member to an inoperative position, means responsive to engine operation for holding said driven member in position where it may be effective for providing a direct drive between said shafts, and manipulative means for shifting said driven member to an inoperative position without regard to the operative condition of the engine of the vehicle.

14. In a power transmitting mechanism for providing a variable speed driving connection between the engine and the road wheels of a vehicle, the combination of a driving shaft adapted to be driven by the engine of the vehicle, a driven shaft connected to the road wheels of a vehicle for driving the same, operating instrumentalities for controlling the speed of said shafts, an automatic clutch operable responsive to speed control of said shafts for effecting a direct drive therebetween and comprising a member associated with the driving shaft, a driven member slidably mounted on said driven shaft, a spring biasing said driven member to an inoperative position, means responsive to engine operation for holding said driven member in position where it may be effective for providing a direct drive between said shafts, and control means associated with the operating instrumentalities of the vehicle for selectively positioning said driven member.

15. In a transmission device for providing a variable speed driving connection between the engine of a vehicle and the road wheels thereof, the combination of a driving shaft, adapted to be driven by the engine of the vehicle, a driven shaft connected to the road wheels of a vehicle for driving the same, means affording an initial driving connection between said shafts, means for automatically effecting a direct drive between said shafts responsive to speed control thereof subsequent to the effecting of an initial low speed drive therebetween, a clutch operable for breaking the driving connection between the engine and said driving shaft, manipulative means associated with both of said means operable for selectively effecting a change in the ratio of the driving connection between said shafts subsequent to the operation of said clutch, and means operable incidental to the operation of said clutch for locking out said automatic means.

16. In a transmission device for providing a variable speed driving connection between the engine of a vehicle and the road wheels thereof, the combination of a driving shaft adapted to be driven by the engine of the vehicle, an engine clutch operable responsive to predetermined conditions of engine operation for connecting and disconnecting the engine and said driving shaft, a driven shaft connected to the road wheels of the vehicle for driving the same, an automatic clutch having driving and driven members connected respectively with the driving and driven shafts and adapted to be positively connected and disconnected responsive to speed control of said shafts for making and breaking a direct driving connection between said shafts, and engine speed governing means controlling the operation of said engine clutch and the operation of said automatic clutch, said engine clutch being adapted to disconnect the engine from said driving shaft prior to the time said shafts attain that condition of operation at which said automatic clutch becomes operative to break the direct driving connection between said shafts.

17. In a transmission for providing a variable speed driving connection between the engine of a vehicle and the road wheels thereof, the combination of a driving shaft adapted to be driven by the engine of the vehicle, an engine clutch operable responsive to predetermined conditions of engine operation for connecting and disconnecting the engine and said driving shaft, a driven shaft connected to the road wheels of the vehicle for driving the same, gearing for providing a low speed driving connection between said shafts to initiate rotation of said driven shaft, an automatic clutch having driving and driven members connected respectively with the driving and driven shafts and adapted to be positively connected and disconnected responsive to predetermined conditions of operation of said shafts for making and breaking a direct driving connection between said shafts subsequent to the effecting of a low speed driving connection between said shafts, said engine clutch being operable to disconnect the engine from said driving shaft prior to the time said shafts attain that condition of operation at which said automatic clutch becomes operable to break the driving connection between said shafts for releasing the torque between said automatic clutch members.

18. In a device of the class described, the combination of a driving shaft having a clutch element thereon, a driven shaft having a clutch element mounted thereon, one of said clutch elements being slidable on the shaft on which it is mounted and axially movable relative to the other of said clutch elements, means operable for connecting said shafts around said clutch elements for initiating the rotation of said driven shaft and for rotating said clutch elements at relatively different rates, automatic means carried by one of said clutch elements engageable with the other of said clutch elements and operable responsive to predetermined conditions of rotation of said shafts for connecting the same through said clutch elements and around said first mentioned means, and means automatically operable for shifting said shiftable clutch element to render said automatic means inoperable when rotation of said driven shaft is effected otherwise than through said first mentioned means.

19. In a transmission for providing a plurality of drives between the engine of a vehicle and the road wheels thereof, the combination of a driving shaft adapted to be driven by the engine of the vehicle, a driven shaft connected to the road wheels of a vehicle for driving the same, means affording an initial driving connection between said shafts, an automatic clutch operable responsive to speed control of said shafts for effecting a drive therebetween at a ratio different than that provided by said initial driving connection, said automatic clutch comprising a member associated with said driving shaft, a member associated with said driven shaft, one of said members being slidable axially with respect to the other of said members, means urging said slidable member to an inoperative position, and means directly responsive to engine operation for holding said slidable member in position where it may be effective for providing a driving connection between said shafts.

20. In a device of the class described, the combination of driving and driven shafts, means providing an initial driving connection between said shafts, an automatic clutch operable responsive to predetermined conditions of rotation of said shaft for connecting said shaft around said means, and means operable when rotation of said driven shaft is effected otherwise than through said means for rendering said automatic clutch inoperable.

21. Power transmitting mechanism for providing a plurality of driving connections between the road wheels of a vehicle and the engine thereof comprising in combination a driving shaft adapted to be driven by the engine of the vehicle, a driven shaft connected to the road wheels of the vehicle for driving the same, a rotatable clutch element connected to said driving shaft, a second rotatable clutch element slidably and non-rotatably connected to said driven shaft, means connecting said shafts around said clutch elements for providing an initial driving connection between said shafts, and a centrifugally operably connecting member carried by one of said clutch elements and operatively engageable with the other of said clutch elements for inter-connecting said clutch elements to connect said shafts around said means.

22. Power transmitting mechanism for providing a plurality of driving connections between the road wheels of a vehicle and the engine thereof comprising in combination a driving shaft adapted to be driven by the engine of the vehicle, a driven shaft connected to the road wheels of the vehicle for driving the same, a rotatable clutch element connected to said driving shaft, a second rotatable clutch element connected to said driven shaft, one of said clutch elements being movable axially relative to the other of said clutch elements, means connecting said shafts around said clutch elements for providing an initial driving connection between said shafts, and a radially movable connecting member carried by one of said clutch elements and operatively engageable with the other of said clutch elements for inter-connecting said clutch elements to connect said shafts around said means.

CARL F. RAUEN.